US012736791B2

(12) United States Patent
Kalinin et al.

(10) Patent No.: US 12,736,791 B2
(45) Date of Patent: Sep. 15, 2026

(54) MICROSCOPE FOR DETERMINING PROPERTIES OF MOVING OBJECTS IN A BIOLOGICAL SAMPLE

(71) Applicant: Carl Zeiss Microscopy GmbH, Jena (DE)

(72) Inventors: Stanislav Kalinin, Jena (DE); Dieter Huhse, Jena (DE); Georg Wieser, Jena (DE); Oliver Holub, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 281 days.

(21) Appl. No.: 18/582,987

(22) Filed: Feb. 21, 2024

(65) Prior Publication Data

US 2024/0280795 A1 Aug. 22, 2024

(30) Foreign Application Priority Data

Feb. 22, 2023 (DE) ..................... 10 2023 201 620.6
Jul. 17, 2023 (DE) ..................... 20 2023 103 998.7

(51) Int. Cl.
*G02B 21/00* (2006.01)
*G01N 21/64* (2006.01)
*G02B 21/16* (2006.01)

(52) U.S. Cl.
CPC ....... *G02B 21/008* (2013.01); *G01N 21/6458* (2013.01); *G01N 21/6486* (2013.01); *G02B 21/0032* (2013.01); *G02B 21/16* (2013.01)

(58) Field of Classification Search
None
See application file for complete search history.

(56) References Cited

U.S. PATENT DOCUMENTS 7,158,295 B2 * 1/2007 Wachsmuth .............. G01J 3/36 359/385
7,170,597 B1 * 1/2007 Hooper .............. G01N 21/6452 356/318

(Continued)

FOREIGN PATENT DOCUMENTS

DE 103 27 486 7/2006
DE 10 2018 128 590 5/2020

(Continued)

OTHER PUBLICATIONS

Arbour et al., "Application of dual-focus fluorescence correlation spectroscopy to microfluidic flow-velocity measurement", Lab Chip, vol. 10, Jan. 25, 2010, pp. 1286-1292.

(Continued)

*Primary Examiner* — Robert E. Tallman
(74) *Attorney, Agent, or Firm* — Grüneberg Global IP, PLLC

(57) ABSTRACT

A microscope for determining properties of moving objects in a biological sample can include a sample space for arranging a biological sample and an objective for capturing a detection radiation coming from a confocal volume created in the sample. The microscope can have a detection beam path along which a captured detection radiation is steered to a detector in the form of a detector array having a plurality of detector elements, with the detector arranged in a plane conjugate to a back-side image plane of the objective. Measurement values from the detector elements can each be read and analyzed on an individual basis. A light source can provide an excitation radiation. In an illumination beam path, a beam-shaping optical unit can shape the excitation radiation to form a confocal volume in the sample space and/or, in the detection beam path, a beam-shaping optical unit can shape the detection radiation.

19 Claims, 10 Drawing Sheets

(56) References Cited

U.S. PATENT DOCUMENTS

| | | | | |
|---|---|---|---|---|
| 10,234,667 | B2 * | 3/2019 | Novikau | G02B 21/0076 |
| 10,371,932 | B2 * | 8/2019 | Singer | G02B 21/26 |
| 2010/0303386 | A1 * | 12/2010 | Enderlein | G06T 3/4053 382/299 |
| 2017/0227748 | A1 * | 8/2017 | Anhut | G02F 1/113 |
| 2017/0343784 | A1 * | 11/2017 | Wu | G02B 21/004 |
| 2018/0196245 | A1 * | 7/2018 | Kleppe | G02B 21/0024 |
| 2020/0150044 | A1 | 5/2020 | Kalkbrenner et al. | |

FOREIGN PATENT DOCUMENTS

| | | |
|---|---|---|
| DE | 10 2021 206 433 | 12/2022 |
| WO | 2020/243698 | 12/2020 |

OTHER PUBLICATIONS

Blom et al., "Parallel flow measurements in microstructures by use of a multifocal 4×1 diffractive optical fan-out element", Applied Optics, vol. 41, No. 31, Nov. 1, 2002, pp. 6614-6620.

Brister et al., "Fluorescence correlation spectroscopy for flow rate imaging and monitoring—optimization, limitations and artifacts", Lab Chip, vol. 5, May 10, 2005, pp. 785-791.

Joseph Huff, "The Airyscan detector from ZEISS: confocal imaging with improved signal-to-noise ratio and super-resolution", Nature Methods, Dec. 2015, pp. i-ii (2 pages).

Lenne et al., "Dynamic molecular confinement in the plasma membrane by microdomains and the cytoskeleton meshwork", The EMBO Journal, vol. 25, Jul. 6, 2006, pp. 3245-3256.

Polatyńska et al., "Temperature dependent FCS studies using a long working distance objective: Viscosities of supercooled liquids and particle size", J. Chem. Phys., vol. 146, Feb. 28, 2017, 1 page.

Scipioni et al., "Comprehensive correlation analysis for super-resolution dynamic fingerprinting of cellular compartments using the Zeiss Airyscan detector", Nature Communications, vol. 9, No. 5120, Nov. 30, 2018, pp. 1-7.

Wawrezinieck et al., "Fluorescence Correlation Spectroscopy Diffusion Laws to Probe the Submicron Cell Membrane Organization", Biophysical Journal, vol. 89, Dec. 2005, pp. 4029-4042.

Wenger et al., "Diffusion Analysis within Single Nanometric Apertures Reveals the Ultrafine Cell Membrane Organization", Biophysical Journal, vol. 92, Feb. 2007, pp. 913-919.

* cited by examiner

MICROSCOPE FOR DETERMINING PROPERTIES OF MOVING OBJECTS IN A BIOLOGICAL SAMPLE

CROSS-REFERENCE TO RELATED APPLICATIONS

This application claims priority to German Patent Application No. DE 10 2023 201 620.6 filed on Feb. 22, 2023, and German Utility Model No. DE 20 2023 103 998.7 filed on Jul. 17, 2023. The content of these applications is hereby incorporated by reference in their entirety.

BACKGROUND OF THE INVENTION

Field of the Invention

The invention relates to a microscope for determining properties of moving objects in a biological sample.

DESCRIPTION OF RELATED ART

Fluorescence correlation spectroscopy (FCS) is a method from the field of confocal scanning microscopy, especially confocal laser scanning microscopy, which has proven its worth, for example for examining the dynamics of the behavior of molecules in cells.

The method, also abbreviated FCS below, has been continually developed further, and so different variants of FCS are available (e.g., Lenne et al., 2006; EMBO J. 25: 3245-3256 and Wenger et al., 2007; Biophys. J. 92: 913-919). One of the variants is what is known as “spot-variation FCS” (e.g., Wawreznieck et al., 2005; Biophys. J. 89: 4029-4042). In the process, excitation radiation is focused and directed at a sample. A so-called confocal volume (simply also referred to as a “focus” in this context) is illuminated in conjunction with the confocal detection in the sample on account of the focusing and the extent of the focus of the focused beam of excitation radiation, both across (x- or y-direction) the propagation direction (the optical axis, as a rule) and in the propagation direction (z-direction). Pieces of brightness information (measurement values) can be acquired for confocal volumes of different sizes. To this end, the numerical aperture (NA) of an objective used for illumination purposes can be varied, wherein for example a changeable iris diaphragm, different pinholes arranged on a revolver or a slider, or a telescope is/are present in the excitation beam path and controlled accordingly. The brightness information is acquired by means of an optical detector (e.g., photodiode).

The publication by Scipioni et al. (2018; Nature Communications; DOI: 10.1038/s41467-018-07513-2) has disclosed a modification of the spot-variation FCS. For acquisition purposes, use is made of a spatially resolving planar detector, the detector elements of which can be read and evaluated individually and independently of one another. Specifically, a detector type referred to as an “Airyscan detector” is used in Scipioni et al.; it is arranged in an intermediate image plane of a detection beam path and the respective detector elements thereof act as individual pinholes (Huff, 2015, Nature Methods; Application Notes, December 2015). In this method configuration, pieces of brightness information from selected detector elements are evaluated, with virtual pinholes of different sizes being simulated by the selection of the detector elements. In this way, it is possible—virtually—to create varying confocal measurement volumes even though the actually illuminated confocal excitation volume remains constant. The procedure according to the publication by Scipioni et al. (2018) allows the simultaneous acquisition of brightness information from up to four different measurement volumes using a single measurement.

To date, the FCS variants known from the prior art do not provide statements, or only provide limited statements, regarding the speed and direction of detected diffusion processes and movements of molecules.

Even in the case of FCS methods having only one confocal volume, the function used for the calculation contains a term depending on a flow speed. However, this term is not sensitive in relation to a flow direction.

The creation and use of a plurality of confocal volumes is also possible (Blom et al., 2002, Applied Optics 41: 6614-6620; Arbour & Enderlein, 2010, Lab Chip 10: 1286-1292; Brister et al., 2005, Lab Chip 5: 785-791; Summary: Polatynska et al., 2017, Journal of Chemistry and Physics 146, DOI: 10.1063/1.4977047). However, these require a complex alignment of the beam paths and multiple measurements in order to determine a flow direction. In theory, the application of more than two confocal volumes allows the speed and direction of a flowing movement to be determined; however, this requires a complex technical arrangement. Further devices for measuring speeds and directions of molecules moving within a sample are known from DE 103 27 486 B4 and U.S. Pat. No. 7,158,295 B2, for example.

SUMMARY OF THE INVENTION

It is an object of the invention to propose a further option for determining properties of moving objects in a biological sample.

The object is achieved by means of the subjects of the embodiments. The embodiments described herein relate to advantageous developments.

The microscope for determining properties of moving objects in a biological sample comprises a sample space for arranging a biological sample and an objective for capturing a detection radiation coming from a confocal volume created in the sample. A detection beam path is also present; the captured detection radiation is steered therealong to a detector in the form of a detector array having a plurality of detector elements. In this case, the detector is arranged in a plane conjugate to the back-side image plane of the objective (also referred to as “pinhole plane”). The measurement values from the detector elements can each be read and analyzed on an individual basis. A light source is present for the purpose of providing an excitation radiation. In an illumination beam path there is a beam-shaping optical unit for shaping the excitation radiation to form a confocal volume in the sample space. In an alternative or in addition, in a detection beam path there is a beam-shaping optical unit for shaping the detection radiation.

For example, one of the aforementioned Airyscan detectors or SPAD arrays can be present as detector. Optical elements such as microlens arrays, for example, may be placed in front of the detector elements.

The invention can be implemented advantageously by virtue of the beam shape of the illumination radiation or detection radiation being adapted in accordance with the current requirements. To this end, a controllably adjustable iris diaphragm can be arranged as a beam-shaping optical unit in the illumination beam path or in the detection beam path of the microscope. For example, a reduction in the diameter of the illumination beam path brings about underfilling on the input side of the objective pupil and hence leads to an increase in the confocal volume.

BRIEF DESCRIPTION OF THE DRAWINGS

The invention is explained below on the basis of exemplary embodiments and figures, in which.

DETAILED DESCRIPTION OF THE INVENTION

Figure 2:
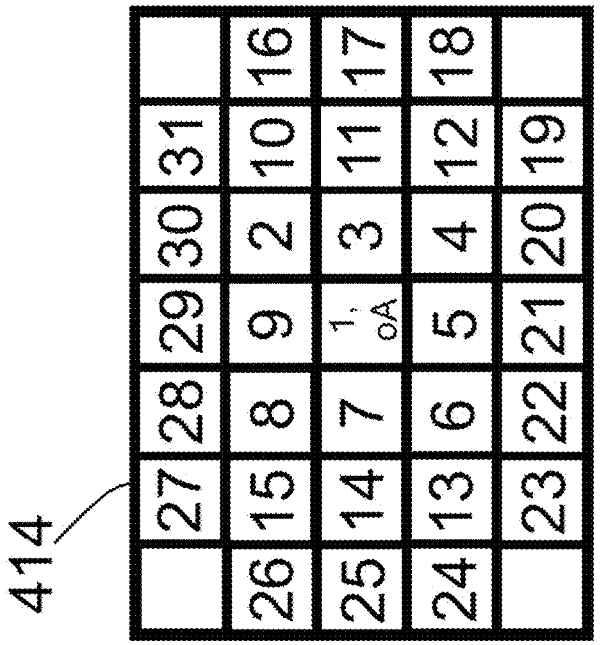
FIG. 2 shows a schematic illustration of a second example of a detector array.

In an embodiment of the microscope according to the invention, a controllably adjustable (laser) beam expander can be arranged as a beam-shaping optical unit in the illumination beam path or in the detection beam path of the microscope. Beam expanders are typically based on telescopic constructions. The confocal volume can likewise be increased or decreased by the effect of the settings of a motorized variable beam expander.

In a further embodiment of the microscope according to the invention, a slit stop can be arranged as a beam-shaping optical unit in the illumination beam path or in the detection beam path, the effect of which creating a PSF that is elongate transversely to the beam path. The presence of an optical element modulating the PSF in space and/or time is likewise possible, for example a spatial light modulator (SLM) or correspondingly adjustable phase masks and/or phase masks that can be controllably brought into and out of the beam path.

The aforementioned stops or optical elements can be advantageously controlled and the optical effect thereof can be influenced in a targeted manner.

Advantageously, the microscope according to the invention also comprises an analysis unit. The latter serves to select the detector elements whose measurement values are intended to be evaluated. Moreover the manner of the evaluation, for example a combination of measurement values (binning), the definition of pairs and extended pairs (see below) and an algorithm of the evaluation to be applied in each case, can be chosen and carried out. The analysis unit can also be designed as a combined analysis and control unit. For example, such an analysis unit or analysis and control unit can be a computer, a microcontroller or an FPGA. Below, reference is made to an analysis and control unit by way of example. The control unit creates control commands for controlling elements of the microscope. The configuration of the control commands can be influenced by the requirements and/or results from the analysis unit.

The analysis and control unit of the microscope is advantageously configured in a step A to use the detector to capture, at a plurality of times over a measurement duration (measurement time period, measurement interval, for example 10 seconds to a few minutes per measurement duration in each case), a detection radiation from a confocal volume created in the sample and in each case analyze the measurement values from the detector elements on an individual basis. Moreover, at least one pair of detector elements can be selected, wherein each partner of a pair is formed by at least one detector element. The measurement values from the detector elements can each be analyzed on an individual basis. It is also possible to respectively combine the measurement values of selected detector elements with one another ("binning").

Correlations of the acquired measurement values from the detector elements of at least one pair among themselves are created in a step B. In the process, in a first partial step B1 correlations are calculated starting from one of the selected detector elements in a first direction to the further selected detector element. This first direction can also be referred to as forward direction.

The configuration of the analysis and control unit optionally allows a second partial step B2 to be carried out in step B, wherein in the second partial step B2 correlations are additionally calculated starting from the further selected detector element in a second direction (back direction) to the first selected detector element.

In a step C, the correlations can be analyzed in respect of the occurrence of a change in the intensity of the measurement values from selected detector elements.

The configuration of the analysis and control unit is explained below on the basis of the description of a method and its configurations.

The concept of the invention also comprises a method for determining properties of moving objects in a biological sample. Said method comprises the steps presented below. A detection radiation whose origin is in a confocal volume created in the sample is captured in a step A. Capture is implemented by means of a plurality of detector elements of a detector array at a plurality of times over a measurement duration (measurement time period, measurement interval, for example 10 seconds to a few minutes per measurement duration in each case), wherein the detector array is arranged in a plane conjugate to the back-side image plane of an objective (also referred to as "pinhole plane"). The measurement values from the detector elements can each be analyzed on an individual basis. It is also possible to respectively combine the measurement values of selected detector elements with one another ("binning").

At least one pair of detector elements is selected in a step B of the method, wherein each partner of a pair is formed by at least one detector element. Cross correlations of the acquired measurement values are created among themselves from the measurement values of at least one pair. In the process, in a first partial step B1 cross correlations are calculated starting from one of the selected detector elements in a first direction to the further selected detector element. This first direction can also be referred to as forward direction.

What is characteristic to the method is that in a second partial step B2 cross correlations are additionally calculated starting from the further selected detector element in a second direction (back direction) to the first selected detector element.

In a step C, the cross correlations or their results are analyzed in respect of the occurrence of a change in the intensity of the measurement values from selected detector elements.

Within this description, the term direction is used within the sense of a vector having a starting point and a virtual propagation line. This means that in a horizontal, for example, a first direction (forward direction) runs toward 0° from a starting point and a second direction (back direction) runs toward 180° from a starting point (see also FIG. 4). A corresponding statement applies to (polar) coordinate systems with a different alignment.

An important aspect of the invention lies in the use of measurement values from selected and individually readable detector elements in order to obtain information regarding the occurrence of movements of specific objects in a sample and, moreover, in order for example to be able to make statements regarding the movement direction and speed. Within the scope of this description, objects refer to molecules, for example proteins, nucleic acids and the like, aggregations, complexes, conglomerates and chelates in particular. The invention moreover allows statements to be made with regards to obstacles and processes that have an influence on the movements of the objects. In comparison with the prior art, it is advantageously possible to obtain meaningful results, even in the case of high and/or changing concentrations of the objects and in the case of high intensities of the detection radiation.

Concentrations of the marked objects can be determined in a further configuration of the invention. This information can be used for example to standardize graphical displays for a user. The concentration can be determined with knowledge of the point spread function (PSF), the diffusion time and the number of objects. It is also advantageous when observing biological samples, in which for example there is an expression of genes and translation of proteins, which are captured as objects within the meaning of the description. The information regarding the changing concentrations can advantageously be taken into account when evaluating the measurement values. In contrast with the prior art, this also allows an examination of samples with varying and high concentrations of objects by means of the invention and allows data with an advantageously high SNR (signal-to-noise ratio) to be obtained.

To determine a concentration of the objects, use is made of the function $$G(\tau)=\left(\frac{<I(t)\cdot I(t+\tau)}{(<I(t)|>)^2}\right) \quad [1]$$

forming the basis for the FCS method.

Here, T denotes the time offset (lag time) and I denotes the intensity.

The intensity of a captured detection radiation and its variations in a confocal volume are captured over a time period of for example a few seconds (measurement duration). A temporal intensity trace is obtained in this way. The intensity variations are based on a changing number of individual fluorescing objects which pass through the confocal volume, for example as a consequence of diffusion or other movements. Within the scope of a temporal autocorrelation, the temporal intensity trace can be compared with itself again following a time lag. The resultant correlation functions (see graphs in FIGS. 9 and 10, for example) allow information to be derived regarding the number of objects and the diffusion time. To this end, the amplitudes of the intensity and the temporal decay behavior, i.e. a convergence to a zero line (baseline), are used.

The similarity of the time lagged intensity traces is emphasized to derive the diffusion time. If they are similar to one another at the outset, i.e. change little over time, the value G(T) remains high. G(T) sinks if the similarity reduces. Thus, high diffusion speeds lead to a more steeply dropping curve than lower speeds. The resultant convergent time until the baseline is reached (see FIG. 10) serves as a reference value of the diffusion time.

The concentration of the objects is determined on the basis of the temporal changes in the intensities (amplitude). Objects move into the confocal volume and out of the latter during a time span, for example a measurement duration. If only a few objects are situated within the confocal volume at any given time, i.e. if the concentration is low, movements of a few objects already lead to significant changes in the intensities. By contrast, movements of individual objects contribute only very little to a change in the amplitude of the intensity values if the concentration is high. In the case of a graphical representation, the graphs start at high correlation values in the case of high concentrations while the starting point is lower in the case of a lower concentration.

To determine the diffusion coefficient and the concentration of the objects, knowledge regarding the specific design of the PSF, especially its current diameter, is required. The PSF is influenced by the components of the microscope, for example the optical lenses, stops, objectives and the wavelengths of the used illumination or excitation radiation and the captured detection radiation (emitted radiation, fluorescence). Proceeding from the technical information available, it is possible to provide a theoretical PSF or theoretical diameter of the PSF and apply this in the experiments.

The theoretical diameter may deviate from that of an actual PSF and may lead to deviations of up to ±30% between the values of the calculated and actual diffusion coefficients and concentration.

A theoretical PSF is sufficient for many applications and renders time-consuming calibrations superfluous. However, it is not possible in this context to take account of any unknown optical systems and their manufacturing tolerances. Remedial action is provided by an optional possibility with regards to the individual calibration of the optical system, in particular of the microscope. This can be implemented by a user or automatically. In this way, the deviations can be reduced to approximately ±5%.

Within the scope of the invention, use is made of the circumstance that each of the detector elements of the detector images a slightly different portion of the confocal volume. Thus, a plurality of differing detection foci are created and the measurement values thereof are analyzed, wherein the very high precision of manufacture and arrangement of the detector elements and optical elements optionally placed upstream thereof, for example microlens arrays, advantageously cause very precise knowledge about the distances of the respective confocal volumes in the case of so-called Airyscan detectors (Huff, 2015, Nature Methods; Application Notes, December 2015) and arrays of SPAD (single photon avalanche diode) detectors. Compared with the solutions from the prior art, the exact knowledge with regards to the position and nature of the respective confocal volumes advantageously allows a calibration thereof, for example using known dye molecules as references, to be dispensed with.

The basic procedure according to the invention is explained by way of example below on the basis of an Airyscan detector with 32 channels (Huff, 2015, Nature Methods; Application Notes, December 2015).

As may be gathered by way of example from FIG. 4, the use of the Airyscan detector allows six cross correlations to be calculated if a respective detector element spacing remains between the detector elements that form a pair and if the outer detector elements are unused (see below). In this case, a difference between the cross correlations calculated for opposite directions indicates a movement of an object that causes or emits detection radiation.

To determine a speed and a direction of the moving object, it is possible to create an experimental cross correlation of the form specified with regards to Equation [2] or by means of more detailed models.

The equation in relation to [1] is:

$$G(\tau) = A\exp\left(-\frac{r_0^2 + \tau^2 v^2 - 2r_0\tau v\cos\alpha}{4D\tau + w_0^2}\right)G_{diff}(\tau) \quad [2]$$

where v is the flow speed (fit parameter); α is an angle between the flow direction and a vector connecting the detector elements (fit parameter); $r_0$ is the distance between the foci of the detector elements of an (extended) pair; $w_0$ is the $1/e^2$ radius of the confocal volume in XY for a detector element; D is the diffusion coefficient and $G_{diff}(t)$ is the diffusion term (2-D or 3-D). The latter describes the autocorrelation in the absence of a movement for a detector element.

The parameter $r_0$ cannot be calculated directly from the spacing of the detector elements from one another; instead, it must be determined empirically or theoretically. The reason for this can be found in the circumstance that the PSF (point spread function) of the illumination radiation and the PSF of the detection radiation are not the same. On the one hand, the parameter $r_0$ can be determined by virtue of a static sample, for example a color solution, being measured, wherein $r_0$ is inserted as parameter to be fitted and the flow speed is set to v=0. Then again, $r_0$ can be derived from a theoretical PSF, by virtue of for example cross correlations with the theoretical PSF being used and fitted by means of Equation [1].

Fitting a plurality of cross correlations for different directions improves the stability of the fits with regards to the angle α. Unlike the case of a two-focus FCS, it is moreover possible to determine all cross correlations from a single set of measurement values.

In a further method configuration, it is possible for a plurality of detector elements to be combined to form a respective one of the parts or partners of a pair in each case; this is referred to below as extended pair. In this case, the acquired measurement values per partner of the extended pair are combined by calculation, for example averaged, before a cross correlation is determined between the measurement values, thus combined by calculation, of the two partners of the extended pair.

The invention can be implemented using only one pair or one extended pair of detector elements. To improve the signal-to-noise ratio, a group of a plurality of pairs and/or extended pairs of detector elements can be defined in a further configuration. In this case, the imaginary connecting lines of the center points of each pair or extended pair run substantially parallel to one another. Although the imaginary connecting lines may, merely by way of example, start at center points of different detector elements, these all run toward 0° for example (see also FIG. 5). After the measurement values acquired per pair were averaged, Equation [1] can again be applied to the measurement values of the pairs selected thus. A corresponding statement applies to the second direction, i.e. the back direction, for example toward 180°. In these cases, the forward direction can also be referred to as common first direction and the back direction can also be referred to as common second direction.

For more in-depth analyses and/or calculations in particular, a mean value of the cross correlations in the first direction and/or second direction, created from the measurement values of the pairs or extended pairs, can be formed in each case.

An advantage of the method implementable by means of the microscope according to the invention lies in the circumstance that a plurality of pairs or extended pairs can be analyzed at the same time. Groups of pairs or extended pairs are advantageously analyzed in this case, wherein the respective common directions of the imaginary connecting lines between the (extended) pairs of each of the groups are aligned differently from one another.

In an advantageous configuration of the microscope according to the invention, it is possible to calculate a plurality of cross correlations, for example over pairs/extended pairs of different alignment, for example of at least two different groups, or the mean values thereof (see above). Optionally, all curves obtained thus can be fitted with the corresponding directions and/or speed as parameters (global fit).

When selecting the detector elements of the respective pairs/extended pairs, it is possible to map a sufficient diffusion path or flow path by virtue of the selected pairs having been spatially separated in each case by at least one detector element not belonging to the relevant pair. Accordingly, the detector elements belonging to an extended pair may be chosen to be distant from one another by at least the distance corresponding to the width of a detector element.

As will be explained below, the detector elements that have a sufficiently similar radius of the confocal volume and whose distances from one another are the same should be chosen in particular. This means that measurement values from the detector elements at the edge are either evaluated separately or discarded.

As explained above, the correlations of the first partial step B1 and/or the partial step B2 are cross correlations in a possible configuration of the invention. In this case, measurement values from timeseries of two data sources, specifically those of the involved partners of the relevant pair, are correlated with one another. As explained in this description, the cross correlations of partial steps B1 and B2 can be used in order for example to obtain information regarding the direction and speed of moving objects.

In a more specific application of the invention, it is also possible to examine the occurrence of what is known as asymmetric diffusion. For example, such asymmetries may occur if cellular compartments are observed, (diffusion) barriers are present or binding processes occur, as a result of the effect of which a diffusion is not of the same strength and does not occur with the same probability in all directions.

To examine such an asymmetric diffusion by means of the invention, it is possible to calculate correlations of a plurality of pairs. Peculiar to this process is that all pairs have at least one detector element as a common partner. The common partner can be a single detector element. It is also possible that the common partner is formed by a plurality of combined ("binned") detector elements, as explained in relation to the extended pairs. So as not to possibly overlay possible indications of asymmetries present by way of the choice of detector elements to be evaluated, the respective further partners of the pairs are advantageously arranged at an identical distance from the common partner.

To increase the efficiency of the invention, it is possible to shape a point spread function (PSF) of an illumination radiation used to create the confocal volume and directed into the sample space along an illumination beam path and/or of the captured detection radiation such that, in particular, those detector elements provided or suitable for a subsequent analysis as partners of the pairs or extended pairs acquire measurement values.

For example, the cross section of the illumination beam path can be stretched in a direction transversely to the respective beam path such that it has an elongate-oval cross section. Such beam shaping can be attained by means of a suitable slit stop or by the effect of an appropriately controlled spatial light modulator (SLM).

Further properties of moving objects can be derived on the basis of the data determined by means of the microscope according to the invention, in particular on the basis of the results of the cross correlations. Thus, it is advantageously possible to determine a local temperature (micro-temperature) of a medium, for example of a matrix or solvent of the sample, at the origin of the detection radiation.

Further, it is possible to determine a viscosity of the medium at the origin of the detection radiation, more precisely: of the respective component of the detection radiation. For example, the basis is also formed by the equation referred to as Einstein-Stokes equation [3]:

$$D(T) = k_B T / (6\pi\eta(T)r). \qquad [3]$$

where:

D is the diffusion coefficient, kB is Boltzmann's constant,

T is the absolute temperature, n is the dynamic viscosity of the medium and r is the hydrodynamic radius (Stokes radius) of an object.

The multiple temperature dependencies of elements of the relationship are evident from Equation [2]. The viscosity $\eta$ or its change can be determined, for example, in the case of a constant temperature T and arising changes in the pressure.

In the exemplary embodiments and figures, identical technical elements are provided with the same reference signs.

Figure 1:
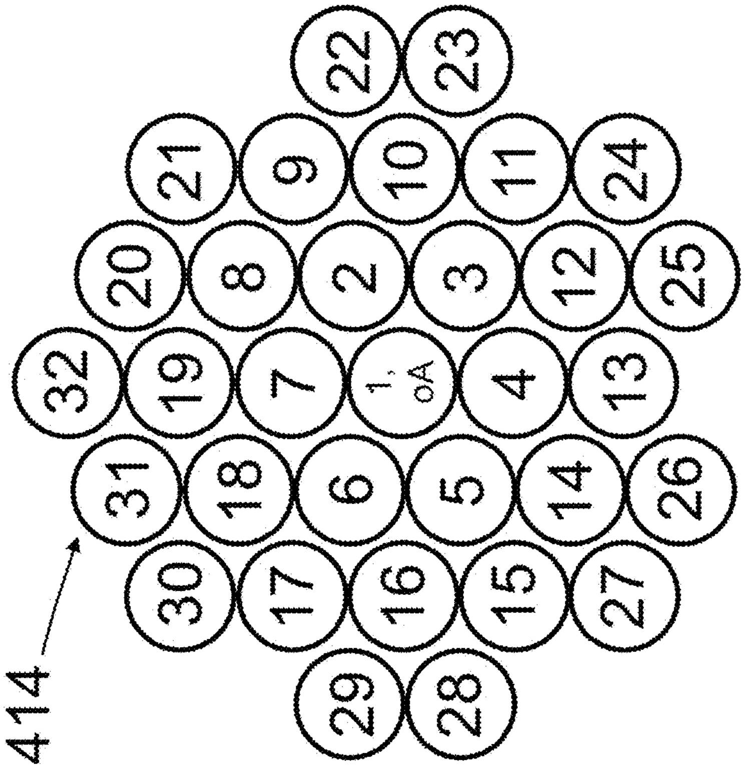
FIG. 1 shows a schematic illustration of a first example of a detector array.

A detector 414 in the form of a so-called Airyscan detector is visible in FIG. 1, in a plan view of its detection plane or detection area. The detector 414 of this embodiment comprises 32 detector elements 1 to 32 and can be used as a spatially resolving detector 414. The acquired brightness information (measurement values) of detector elements 1 to 32 can be read individually and can also be combined with one another as desired ("binning"). The extent of the beam of a detection radiation (see also FIG. 3) can for example be chosen such that it is incident on the detection plane with 1.25 Airy units (AU). For example, each of the detector elements 1 to 32 can detect a portion of 0.2 AU. The central detector element denoted by reference sign "1" is located on the optical axis (oA) of the detection beam path 410 (see FIG. 3).

FIG. 2 shows a further embodiment of a spatially resolving detector 414 in a row and column arrangement of the detector elements 1 to 31, as can be realized, for example, in a SPAD array, a CMOS chip or an sCMOS chip. Here, too, the pieces of brightness information from the detector elements 1 to 31 can be read on an individual basis or combined as desired.

Figure 3:
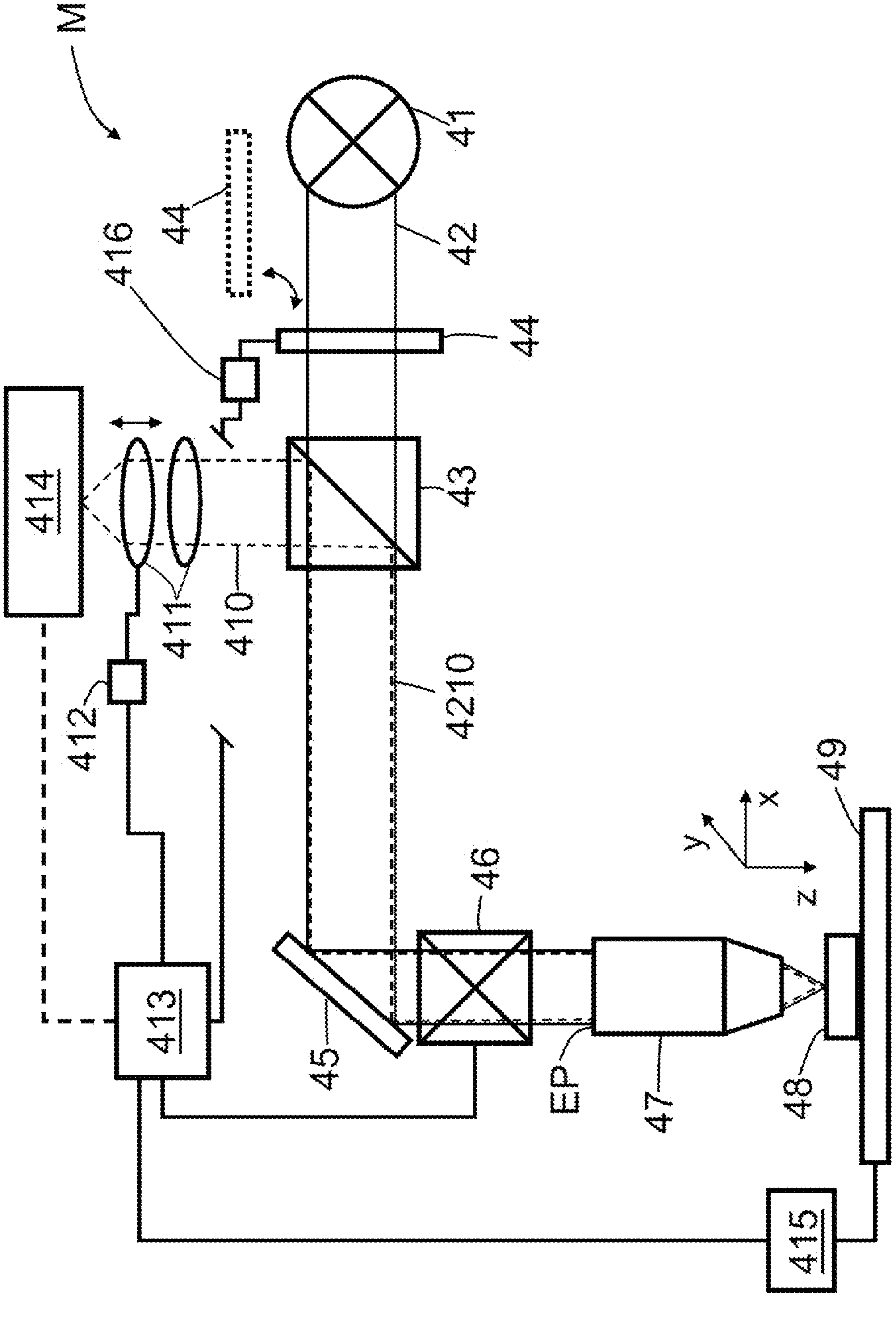
FIG. 3 shows a schematic illustration of an exemplary embodiment of a microscope according to the invention.

FIG. 3 schematically shows a microscope M according to the invention. The latter comprises a light source 41, for example a laser light source, starting from which a beam of an excitation radiation (illumination radiation) is emitted and guided along an illumination beam path 42 (excitation beam path 42). Optional optical elements for shaping and/or collimation of the excitation radiation are not shown. Arranged in the illumination beam path 42 is a beam-shaping optical unit 44 for the controlled change of an extent of the beam, which in the exemplary embodiment is in the form of a controllably adjustable stop. In further embodiments, a turret or a slide can also be present by means of which different stops can be introduced into the illumination beam path 42. Alternatively, the beam-shaping optical unit 44 can also be a controllably adjustable telescope, a beam expander, a zoom optical unit, an acousto-optic element or an SLM.

The beam-shaping optical unit 44 can be moved out of the illumination beam path 42 by means of a drive 416 (indicated by a dashed line) to effect different numerical apertures, within whose respective angular ranges the excitation radiation can be directed into a sample 48 to be imaged. The beam-shaping optical unit 44 may be adjustable in further embodiments with regard to its transmissivity for the excitation radiation, in particular with regard to a hole diameter (pinhole, iris diaphragm) or the length and width of a slit or transparent region (adjustable slit aperture, acousto-optic element) or the angle alignment and the phase information.

After passing through the beam-shaping optical unit 44, the excitation radiation is incident on a main color splitter 43, which is transmissive to the excitation radiation and allows it to pass. Downstream of the main color splitter 43, the excitation radiation passes through a portion of the beam path of the microscope M which is referred to as the common beam path 4210 and along which the excitation radiation and a detection radiation (see below) are guided together or can be guided together.

By means of a scanner 46 arranged thereafter, the beam of the excitation radiation which was previously deflected by means of a mirror 45 can be controllably deflected and be directed into the entrance pupil EP of an objective 47. The mirror 45 allows a compact design and may be omitted in further embodiments of the device if no deflection of the excitation beam path 42 is required or envisaged.

The excitation radiation, which is set by the effect of the beam-shaping optical unit 44 in its lateral extent and controllably deflected by means of the scanner 46, is focused by the effect of the objective 47 in a sample space in which the sample 48 to be imaged may be present on a sample stage 49. In combination with the confocal detection, the excitation radiation radiated in with such focusing brings about a confocal excitation volume.

A detection radiation brought about in the sample 48 by the excitation radiation in the confocal excitation volume is captured by the objective 47 and guided along a detection beam path 410 (shown with dashed lines), which coincides with the excitation beam path 42 up to the main color splitter 43.

In further embodiments of the device according to the invention, the detection radiation can be captured by means of a further objective (not shown). In such a case, the excitation beam path 42 and the detection beam path 410 can be completely separated from one another or they are combined again, for example by means of a further color splitter (not shown), to form the common beam path 4210.

In the illustrated exemplary embodiment, the detection radiation is converted into a resting beam as a consequence of passing through the scanner 46 ("descanned") and reaches the main color splitter 43. The latter is reflective to the wavelength of the detection radiation, which differs from the wavelength of the excitation radiation. The detection radiation reflected at the main color splitter 43 reaches a zoom optical unit 411 optionally present in the detection beam path 410. The zoom optical unit is adjustable by means of a zoom drive 412. In further embodiments, the transmissivity and the reflectivity of the main color splitter 43 may also be implemented in reverse, with the result that the excitation radiation is reflected and the detection radiation is allowed to pass through. The beam paths 42 and 410 must then be designed accordingly.

The beam-shaping optical unit 44, the scanner 46, the zoom drive 412, and the drives 415 and 416 and optionally the light source 41 are suitably connected to an analysis and control unit 413 for exchanging data and control commands. For example, the analysis and control unit 413 is a computer or a suitable control circuit and is configured to carry out the method according to the invention. In particular, it is configured to carry out and evaluate cross correlations of image data from the above-described pairs, extended pairs and/or groups, and optionally configured to determine diffusion coefficients, flow speeds and flow directions of moving objects, local temperatures and/or local viscosities.

The zoom optical unit 411 is a means for the controlled change of an extent of the beam of the detection radiation which can be used to adapt the extent of a beam of the captured detection radiation to the size of a detection area (detection plane) of a spatially resolving detector 414 that is likewise arranged in the detection beam path 410 in an intermediate image ("pinhole plane"). The aim is to illuminate the detection area in full where possible or adapt the latter accordingly to the respective requirements. Accordingly, the detection radiation is directed at the detector 414 by means of the zoom optical unit 411 and adapted with regard to the extent of its beam by means of the zoom drive 412.

Optionally, the analysis and control unit 413 and the detector 414 can be interconnected, for example to allow the analysis and control unit 413 to generate control commands and/or validate these, on the basis of the acquired pieces of brightness information from the detector 414. By way of example, these control commands serve to control the light source 41, the means 44, the scanner 46, the zoom drive 412, and/or an optional drive 415 of the sample stage 49.

Figure 4:
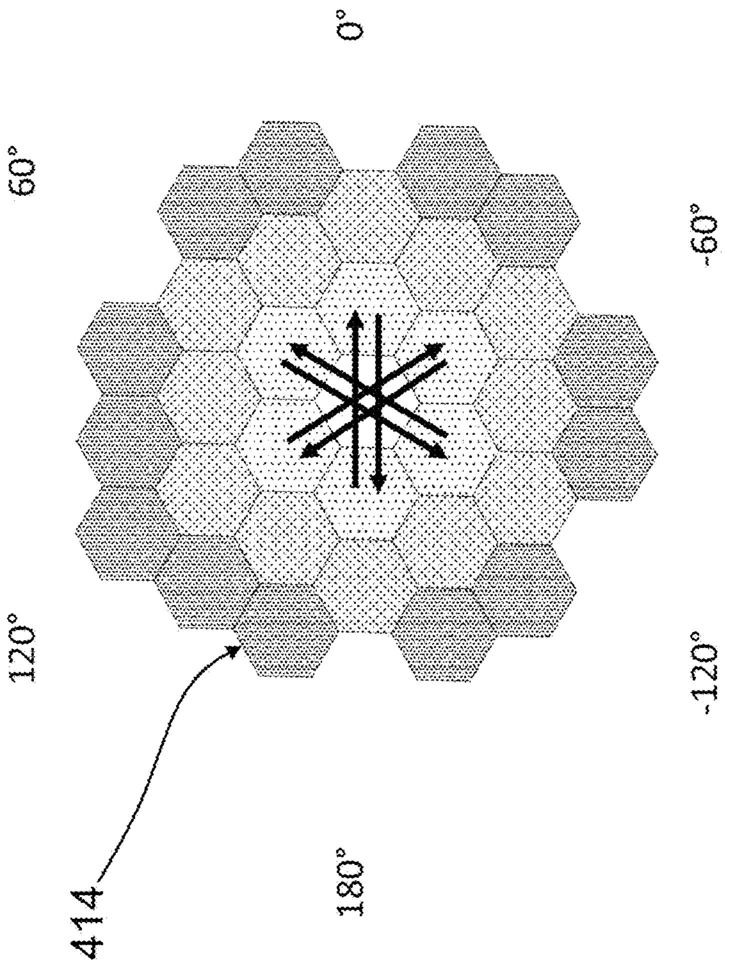
FIG. 4 shows a schematic illustration of a detector array and pairs of detector elements chosen by way of example.
Figure 5:
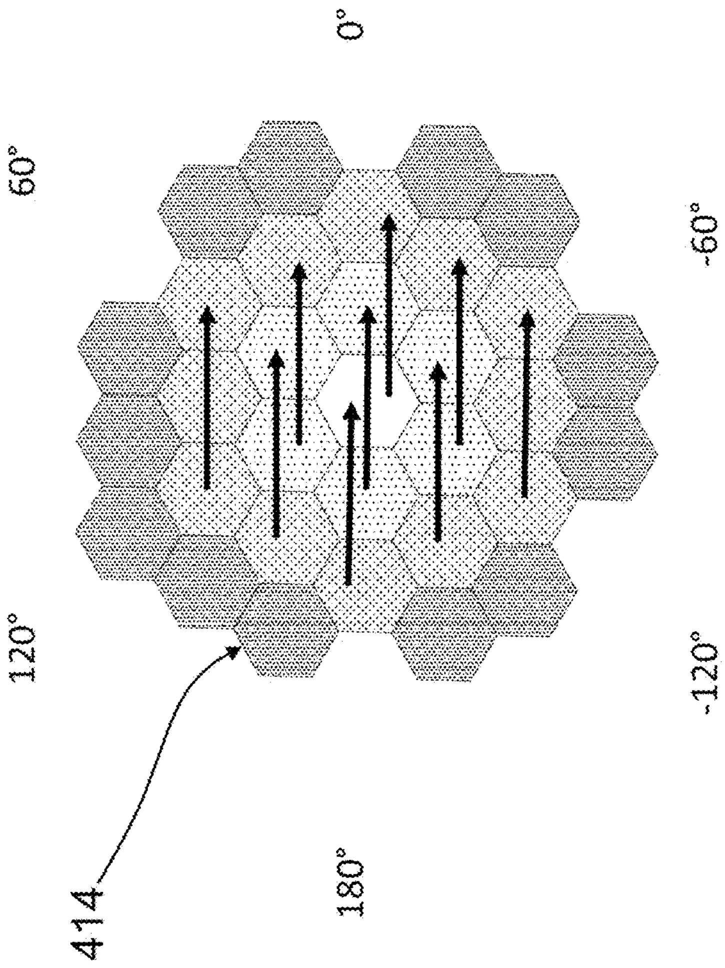
FIG. 5 shows a schematic illustration of the detector array and a group of selected pairs of detector elements.
Figure 6:
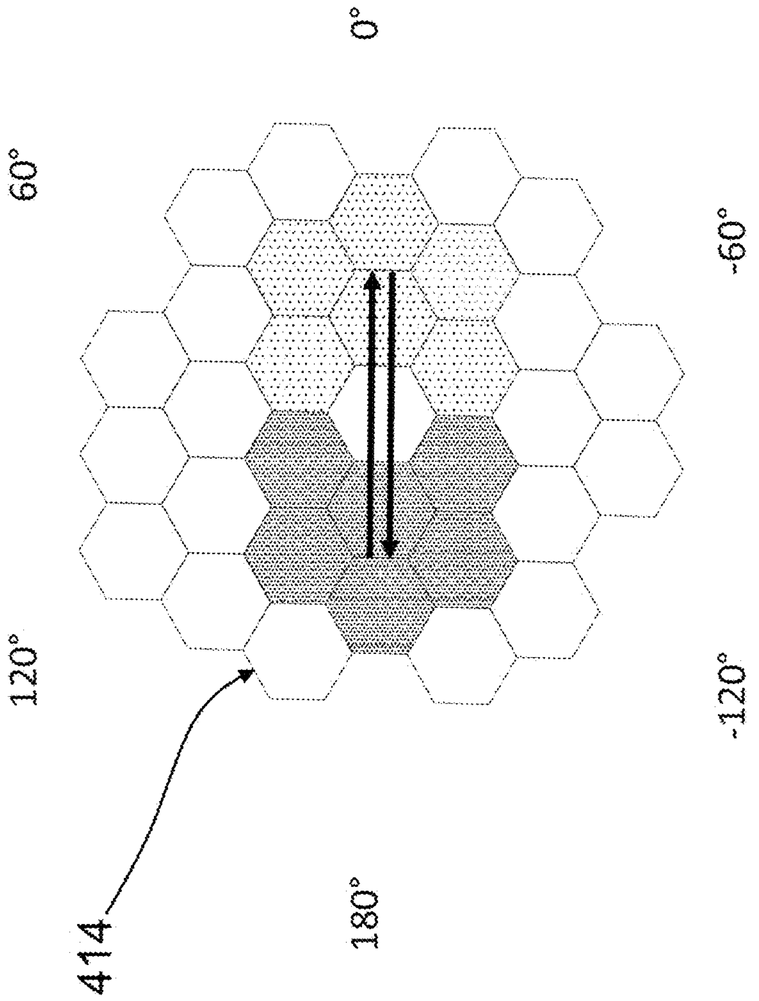
FIG. 6 shows a schematic illustration of a detector array and an extended pair of detector elements chosen by way of example.

FIGS. 4 to 6 in each case specify technical circumstances on the basis of the detector elements 1 to 32 of a detector 414 of the Airyscan detector type. A corresponding statement applies to detectors 414 of the type presented in FIG. 2. In a subsequent specification of the numbers of the relevant detector elements, reference is made to FIG. 1. The central detector element 1 is shown in the following FIGS. 4 to 6 without a pattern fill for better clarity.

FIG. 4 once again shows a plan view of the detection area of the detector 414 (rotated approximately 30° anticlockwise vis-à-vis FIG. 1). For the purposes of the description, directions are defined proceeding from detector element 1 and, by way of example, denoted by degree values between 0° and 180° and −60° and −120°. Arrows are used to show three pairs of selected detector elements by way of example, wherein the start and end of each arrow indicates one partner of the relevant pair. The arrow direction specifies the forward direction and the back direction of the total of six cross correlations carried out on the basis of the intensity values (brightness values, measurement values) acquired by the partners of each pair. The different pattern fills highlight the three rings arranged around the central detector element 1.

If only the pairs and directions shown by way of example in relation to FIG. 4 are supplied to the determination of cross correlations, then the efficiency of the method is low since measurement values acquired by other detector elements remain unconsidered. However, if use is made of the circumstance that the radius of the confocal volume $w_0$ is approximately constant for the central detector element 1 and the inner two rings of detector elements 2 to 19, then it is possible to select and define nine pairs of detector elements for each direction, as illustrated by way of example in FIG. 5 for the direction 180°→0°. The nine curves obtained therefrom can be averaged and fitted using Equation [1]. The use of the plurality of curves improves the signal-to-noise ratio.

Cross correlations for the other five directions (−120°→60°, −60°→120°, 0°→180°, 60°→−120° and 120°→−60°; not shown) can be calculated in the same way. The image data from detector elements 20 to 32 can be discarded or separately combined by calculation.

In a further method configuration, the measurement values from detector elements 20 to 32, or 19 to 31 according to FIG. 2, can also be used, for example depending on a selected imaging ratio of the zoom optical unit 411 (see FIG. 3) and the resultant signal strengths of the individual channels (detector elements).

In an alternative configuration of the method according to the invention, a plurality of detector elements are combined to form extended pairs. In FIG. 6, this is shown by way of example for detector elements 5, 6, 7, 16, 17 and 18 as elements of the one partner of the extended pair and detector elements 2, 3, 4, 10, 11 and 12 as elements of the other partner of the extended pair. In this example, cross correlations can be calculated for the directions of 180°→0° (common first direction, forward direction) and 0°→180° (common second direction, back direction), wherein the measurement values from the elements of each partner of the extended pair were averaged previously. The center points of the respective partners of the extended pair are spaced apart from one another by more than the extent of one of the detector elements 1 to 32.

Figure 7:
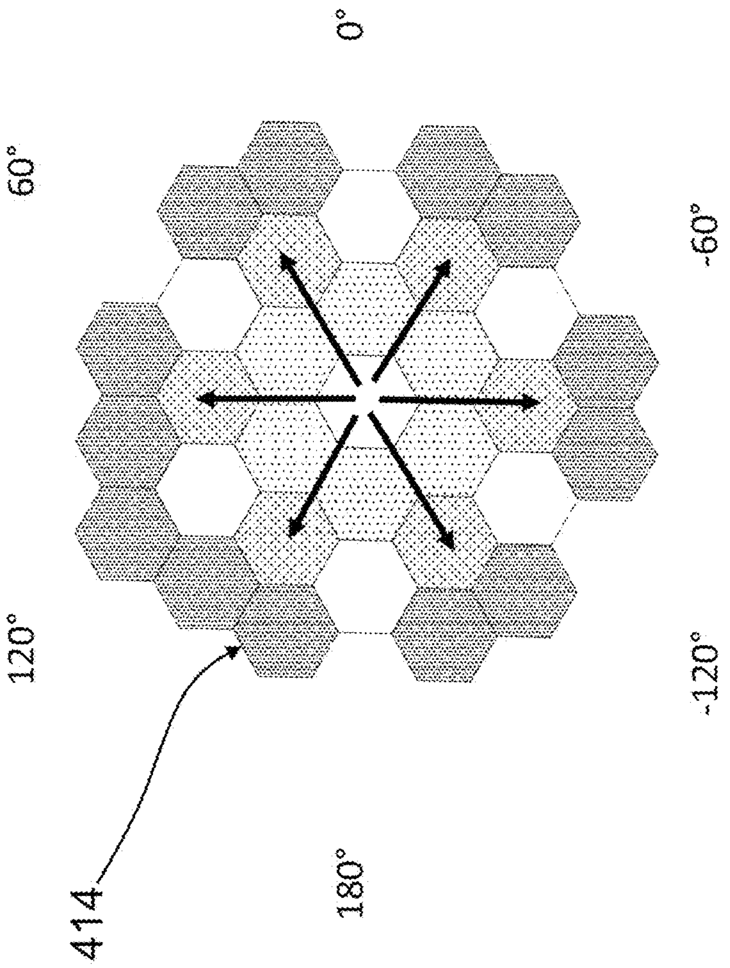
FIG. 7 shows a schematic illustration of a detector array and a first configuration of selected pairs of detector elements, wherein the central detector element acts as a common partner for all pairs.
Figure 8:
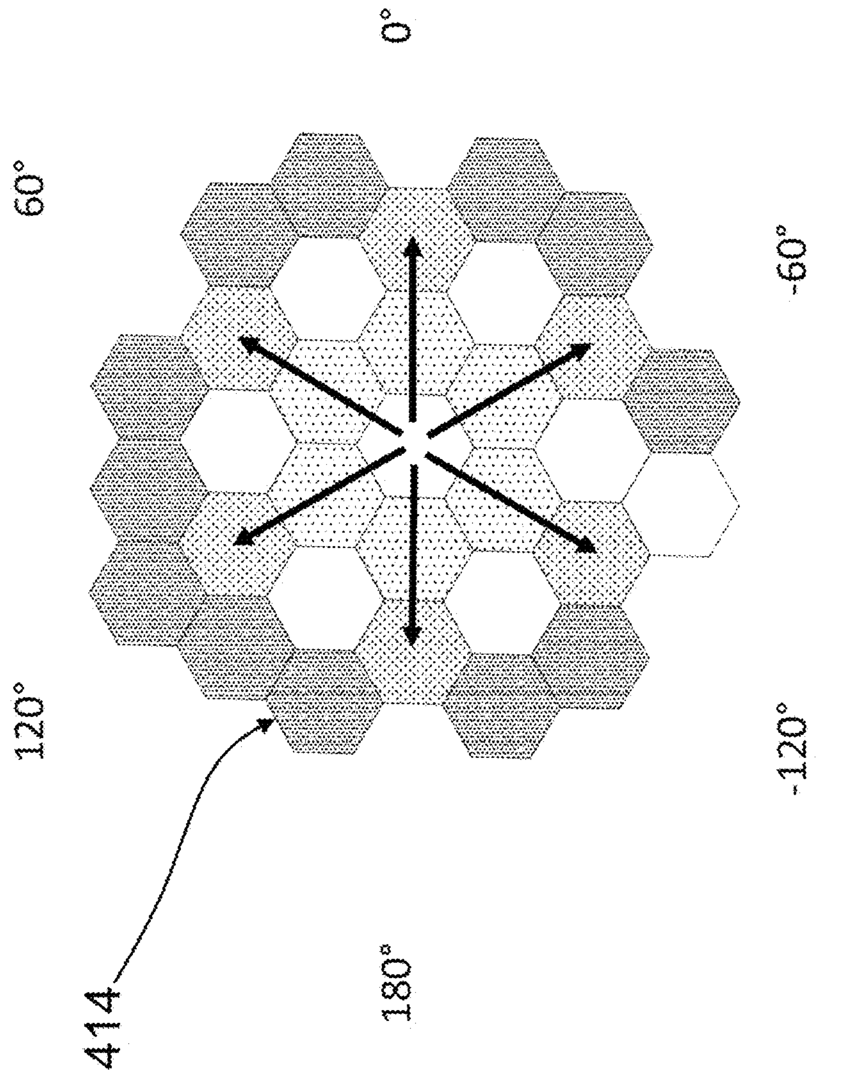
FIG. 8 shows a schematic illustration of a detector array and a second configuration of selected pairs of detector elements, wherein the central detector element acts as a common partner for all pairs.

FIGS. 7 and 8 relate to a configuration of the invention, in which the analysis and control unit 413 (not shown) is configured to examine the presence of an asymmetric distribution of the intensities of the measurement values and, in particular, to be able to deduce an asymmetric diffusion therefrom.

In contrast to the above-described configurations of the invention, only the central detector element 1 and certain detector elements 8 to 19 are selected in the exemplary embodiment and pairwise cross correlations are calculated in each case (also referred to as pair correlations; in each case highlighted by arrows and hatching). In this case, the central detector element 1 is used as common detector element for each of the selected pairs. Of detector elements 8 to 19, detector elements 8, 10, 12, 14, 16 and 18 (inner detector elements; FIG. 7) are slightly closer to the central detector element 1 than detector elements 9, 11, 13, 15, 17 and 19 (outer detector elements; FIG. 8). Such a distinction between inner and outer detector elements is advised since these small differences in the distances from the central detector element 1 can already influence the results of the correlations.

The individual cross correlations describe concentration and diffusion of objects in 12 directions (FIGS. 7 and 8), with the central detection element 1 forming the starting point in each case (see arrows). If differences in the measurement values occur in one or more of the 12 directions, these can be identified and for example prepared graphically for a user. For a clearer illustration, the values obtained can be referenced with respect to a reference value (be normalized) before being displayed.

While differences in respect of the occurring diffusion can be established, this configuration of the invention does not allow a movement direction of measured objects to be determined.

In order to obtain meaningful results, the central detector element 1 must not be directed at a barrier for example, but must instead, by way of example, be directed at the interior of one of the compartments of the sample, for example of the cell of a biological sample.

Figure 9:
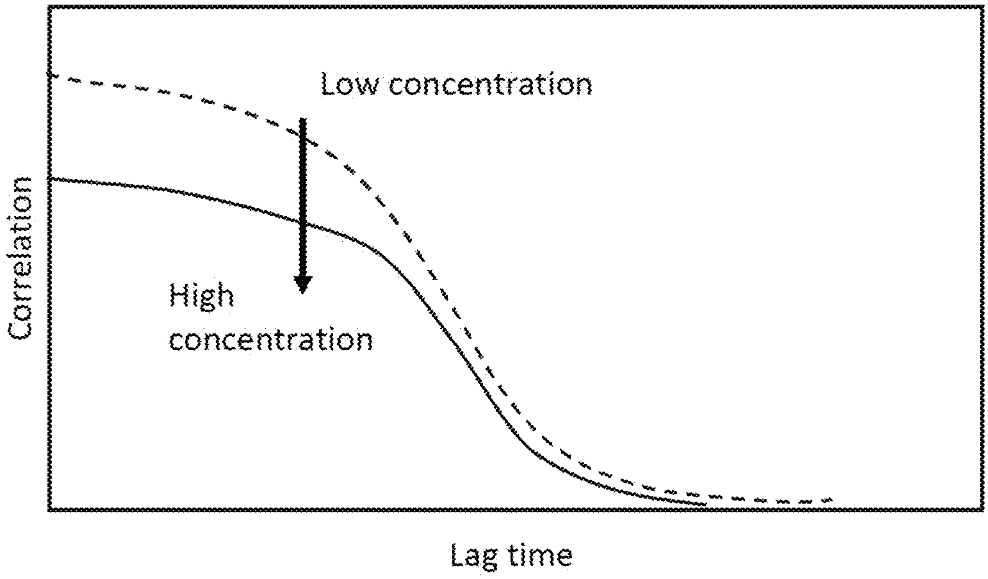
FIG. 9 shows an exemplary graph of two correlation functions of samples of different concentration.

An exemplary graph of two correlation functions of samples of different concentrations of objects emitting a detection radiation is shown in FIG. 9. Along a time lag (measurement duration), the correlation of the occurring amplitudes of an acquired intensity of the detection radiation reduces in each case. In the process, the correlation of the sample with a lower concentration (dashed line) falls faster than that of the sample with a higher concentration since individual objects already have a significant effect on a currently acquired intensity.

Figure 10:
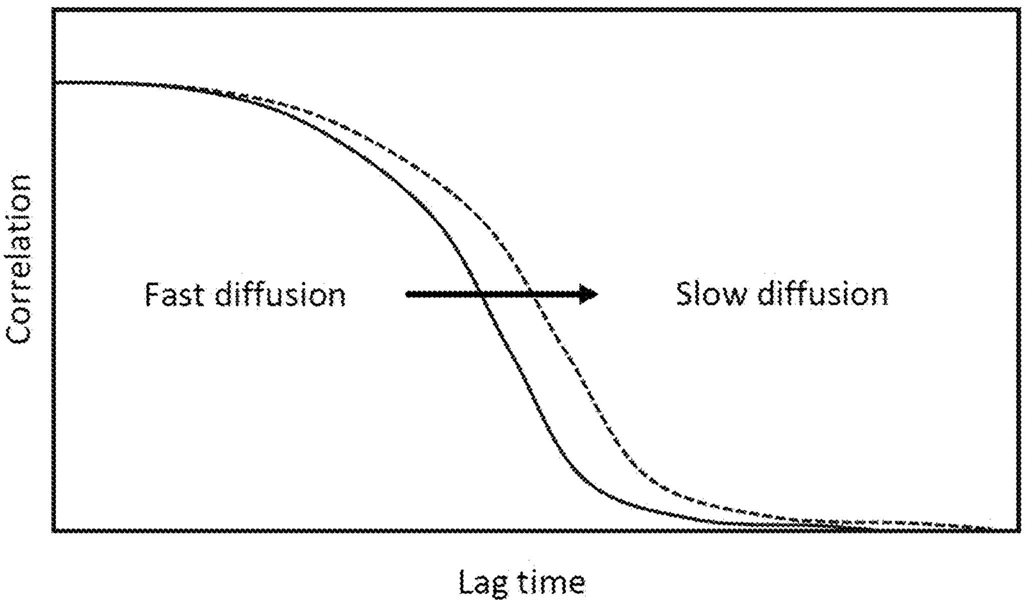
FIG. 10 shows an exemplary graph of two correlation functions of samples of different diffusion speeds.

By way of example, FIG. 10 illustrates the behavior of two samples with different diffusion speeds. While the (auto-)correlation over time reduces quickly in the case of a fast diffusion (higher diffusion speed), this occurs more slowly at a lower diffusion speed.

Figure 11:
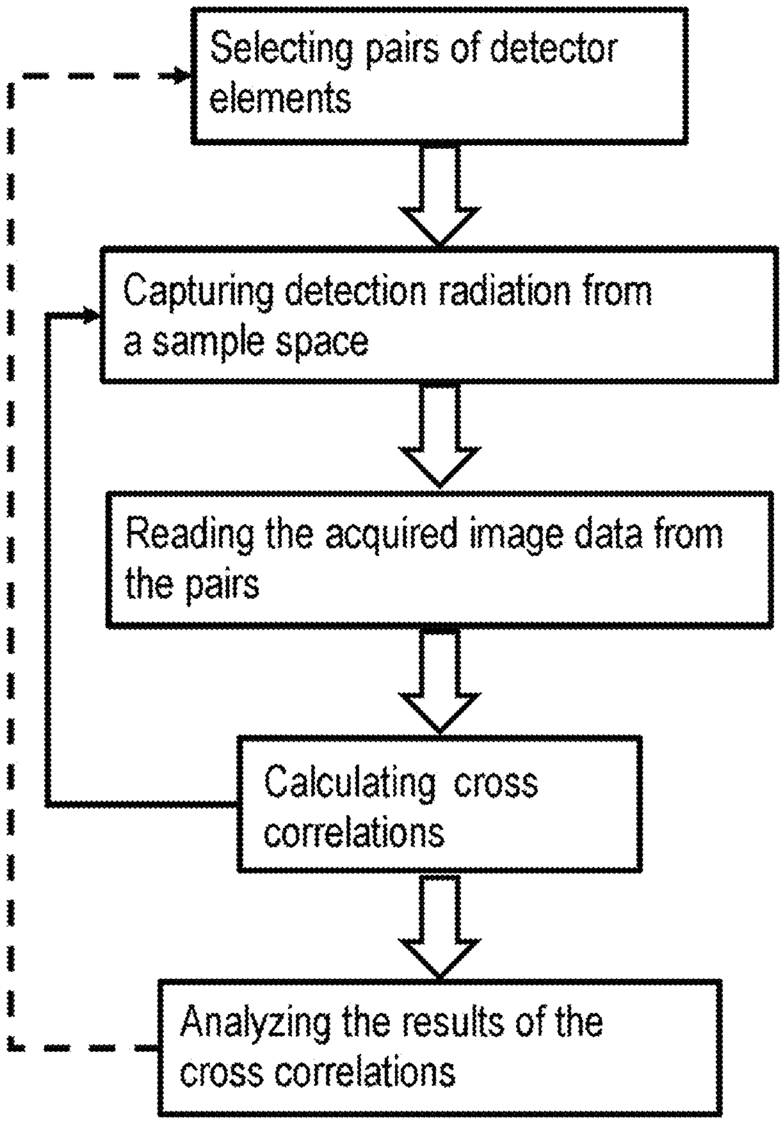
FIG. 11 shows a diagram of a configuration of the method according to the invention.

FIG. 11 is used to illustrate a possible configuration of the method according to the invention. Initially, at least one pair of detector elements whose measurement values are intended to be used in the following steps is selected and defined. A corresponding statement applies to groups of pairs or to extended pairs. A detection radiation coming from the sample space is captured and the resultant measurement values of the selected pairs are read in order to be able to supply these to the calculation of the corresponding cross correlations, in each case in the forward direction and back direction. The results of the cross correlations are subsequently analyzed.

The acquisition of further data and/or selection of new pairs of detector elements is optionally possible following the calculation of the cross correlations or in response to the results of the analysis.

The practical implementation of the method according to the invention can be assisted by means of a menu navigation ("wizard"), which in each case proposes appropriate options for the individual method steps to a user.

The use of the menu navigation means that some technical requirements are specified by the user. For example, the latter specifies objectives to be used, supported laser lines and the correct beam path (illumination and/or detection). In addition or an alternative, dyes or fluorophores to be used can be specified by the user. Suitable laser lines, beam paths and/or control parameters are accordingly proposed or set by means of the menu navigation. Moreover, a correct alignment of the detector 414 to be used is necessary in order to subsequently obtain good quality measurement values and in order to hence create the possibility of calculating a plurality of cross correlations.

A reference image of the sample can be recorded in a further step. For example, images of the sample at different wavelengths ("tracks") can be recorded at one or more locations and can be displayed. A user and/or suitable programming (for example, image evaluation methods, use of artificial intelligence) can select at least one region of interest (ROI) on the basis of the displayed data. An advantage of using a plurality of wavelengths lies in a higher information density for the selection of the regions of interest to be carried out. An FCS measurement of the selected locations is subsequently carried out. This is implemented using only one wavelength.

The user can use the reference image as a map, on which they can for example define up to ten positions of in each case one spot (step 3). A corresponding symbol (for example: "spot selection icon") reproduces the linked relationships between the selected spot positions and the image coordinates of the associated detector elements, in particular of the inner rings with detector elements 1 to 19. The quantity and/or quality of the acquired measurement values, optionally per spot, can be displayed graphically, for example by virtue of count data being displayed with different color codes. This allows the user to select the positions differently when necessary, optionally with resorting to the second track (see above). To optimize the CMP (counts per molecule), it is possible to update the intensity of a laser used to excite the detection radiation, a gain (e.g., high voltage of the PMT) and the observed z-position.

A fourth step of the menu navigation is only available if a reference image is present. Measurement values are stored in a metafile in each step. All values can be retrieved if the menu navigation is started another time.

REFERENCE SIGNS

1 to 32 Detector elements
41 Light source
42 Illumination beam path, excitation beam path
43 Main color splitter
44 Beam-shaping optical unit
45 Mirror
46 Scanner
47 Objective
48 Sample
49 Sample stage
410 Detection beam path
411 Zoom optical unit
412 Zoom drive
413 Analysis and control unit
414 Detector
415 Drive
416 Drive
4210 Common beam path

The invention claimed is:

1. A microscope for determining properties of moving objects in a biological sample, comprising:

a sample space for arranging a biological sample;

an objective for capturing a detection radiation coming from a confocal volume created in the sample;

a detection beam path along which a captured detection radiation is steered to a detector in the form of a detector array having a plurality of detector elements, wherein the detector is arranged in a plane conjugate to a back-side image plane of the objective, and measurement values from the detector elements can each be read and analyzed on an individual basis;

a light source for providing an excitation radiation and there being, in an illumination beam path, a beam-shaping optical unit for shaping the excitation radiation to form a confocal volume in the sample space and/or, in the detection beam path, a beam-shaping optical unit for shaping the detection radiation, and an analysis and control unit configured to use the detector to capture, at a plurality of times over a measurement duration, a detection radiation from a confocal volume created in the sample and to be able to in each case analyze the measurement values from the detector elements on an individual basis; and configured to select at least one pair of detector elements, wherein each partner of a pair is formed by at least one detector element;

in a step B configured to create correlations of the acquired measurement values from the detector elements of at least one pair among themselves, wherein in a step B1 correlations are calculated starting from one of the selected detector elements in a first direction to the further selected detector element; and optionally in a step B2 correlations are additionally calculated starting from the further selected detector element in a second direction (back direction) to the first selected detector element; and in a step C configured to analyze the correlations in respect of the occurrence of a change in the intensity of the measurement values from selected detector elements.

2. The microscope according to claim 1, wherein the beam-shaping optical unit for shaping the excitation radiation and/or the beam-shaping optical unit for shaping the detection radiation, which is present, comprises a slit stop, a beam expander, or a pinhole.

3. The microscope according to claim 1, wherein the beam-shaping optical unit for shaping the excitation radiation and/or the beam-shaping optical unit for shaping the detection radiation, which is present, comprises a spatial light modulator.

4. The microscope according to claim 1, wherein in B2 correlations are additionally calculated starting from the further selected detector element in a second direction (back direction) to the first selected detector element.

5. The microscope according to claim 4, wherein the correlations of B1 and/or B2 are cross correlations.

6. The microscope according to claim 5, wherein correlations of a plurality of pairs are calculated, and wherein all pairs have at least one detector element as a common partner.

7. The microscope according to claim 6, wherein the respective further partners of the pairs are arranged at an identical distance from the common partner.

8. The microscope according to claim 1, wherein a plurality of detector elements are combined to form a respective one of the partners of an extended pair.

9. The microscope according to claim 1, wherein a group of a plurality of pairs or plurality of extended pairs of detector elements is defined, wherein the imaginary connecting lines of the center points of the pairs or extended pairs run parallel to one another.

10. The microscope according to claim 9, wherein a mean value of the cross correlations in a first direction and/or a second direction, created from the measurement values of the pairs or extended pairs, is formed.

11. The microscope according to claim 9, characterized by a determination of a plurality of groups of detector elements, wherein the respective imaginary connecting lines between the groups are aligned differently from one another.

12. The microscope according to claim 9, wherein cross correlations of measurement values of the pairs or extended pairs of at least two different groups are formed.

13. The microscope according to claim 12, wherein a speed and/or a movement direction of an object is determined on the basis of the cross correlations by virtue of a plurality of cross correlations.

14. The microscope according to claim 8, wherein the partners of a pair are spatially separated in each case by at least one detector element not belonging to the relevant pair.

15. The microscope according to claim 13, wherein the speed and/or the movement direction of an object is calculated over pairs or extended pairs with different alignments and all curves obtained thus are fitted with the directions and/or a speed as a parameter.

16. The microscope according to claim 1, comprising the beam-shaping optical unit for shaping the excitation radiation.

17. The microscope according to claim 1, comprising the beam-shaping optical unit for shaping the detection radiation.

18. The microscope according to claim 16, comprising the beam-shaping optical unit for shaping the detection radiation.

19. A microscope for determining properties of moving objects in a biological sample, comprising:

a sample space for arranging a biological sample;

an objective for capturing a detection radiation coming from a confocal volume created in the sample;

a detection beam path along which a captured detection radiation is steered to a detector in the form of a detector array having a plurality of detector elements, wherein the detector is arranged in a plane conjugate to a back-side image plane of the objective, and measurement values from the detector elements can each be read and analyzed on an individual basis; and a light source for providing an excitation radiation and there being, in an illumination beam path, a beam-shaping optical unit for shaping the excitation radiation to form a confocal volume in the sample space and/or, in the detection beam path, a beam-shaping optical unit for shaping the detection radiation, wherein a group of a plurality of pairs or plurality of extended pairs of detector elements is defined, wherein the imaginary connecting lines of the center points of the pairs or extended pairs run parallel to one another, wherein cross correlations of measurement values of the pairs or extended pairs of at least two different groups are formed, and wherein a speed and/or the movement direction of an object is calculated over pairs or extended pairs with different alignments and all curves obtained thus are fitted with the directions and/or a speed as a parameter.

* * * * *